United States Patent [19]

Ishii

[11] Patent Number: 5,187,361
[45] Date of Patent: Feb. 16, 1993

[54] OBJECT DETECTION APPARATUS OF THE PHOTOELECTRIC REFLECTION TYPE WITH SAMPLED DATA

[75] Inventor: Takeshi Ishii, Tokyo, Japan

[73] Assignee: Copal Company Limited, Tokyo, Japan

[21] Appl. No.: 509,402

[22] Filed: Apr. 16, 1990

[30] Foreign Application Priority Data

Apr. 25, 1989 [JP] Japan ................................. 1-104878
Apr. 25, 1989 [JP] Japan ................................. 1-104879

[51] Int. Cl.$^5$ ............................................... G01V 9/04
[52] U.S. Cl. ................................................. 250/222.1
[58] Field of Search ................... 250/221, 222.1, 561;
340/556, 555, 557

[56] References Cited

U.S. PATENT DOCUMENTS

| | | | |
|---|---|---|---|
| 3,641,549 | 2/1972 | Misek et al. | |
| 3,987,428 | 10/1976 | Todeschini | |
| 4,012,635 | 3/1977 | Walter et al. | 250/221 |
| 4,282,430 | 8/1981 | Hatten et al. | 250/221 |
| 4,601,574 | 7/1986 | Yamane et al. | 250/201.6 |
| 4,767,934 | 8/1988 | Stauffer | 250/561 |
| 4,774,403 | 9/1988 | Arts | 250/561 |
| 4,797,547 | 1/1989 | Blanc et al. | 250/222.1 |
| 4,816,667 | 3/1989 | Meinert | 250/222.1 |
| 4,879,461 | 11/1989 | Philipp | 250/222.1 |
| 4,903,009 | 2/1990 | D'Ambrosia et al. | 250/221 |
| 4,970,384 | 11/1990 | Kambe et al. | 250/221 |

FOREIGN PATENT DOCUMENTS

| | | |
|---|---|---|
| 147501 | 3/1984 | European Pat. Off. |
| 105528 | 4/1984 | European Pat. Off. |
| 458400 | 4/1989 | European Pat. Off. |
| 345383 | 12/1989 | European Pat. Off. |
| 202904 | 6/1972 | Fed. Rep. of Germany |
| 294952 | 11/1981 | Fed. Rep. of Germany |
| 2288970 | 9/1975 | France |
| 0047466 | 4/1980 | Japan ................................. 340/556 |
| WO88/0590 | 8/1988 | PCT Int'l Appl. |

Primary Examiner—David C. Nelms
Assistant Examiner—Michael Messinger
Attorney, Agent, or Firm—Sixbey, Friedman, Leedom & Ferguson

[57] ABSTRACT

The object detection apparatus of the photoelectric reflection type is comprised of an optical source for generating an optical ray, an optical projection system having an optical axis extending through an observation zone along a limited observation range for directing the optical ray along the optical axis, and an optical collecting system for collecting the optical ray reflected by an object which traverses the observation zone within the observation range to focus the ray into an optical spot. Further a stationary photosensor is provided to receive said optical spot and operates to generate an electrical signal only when an object enters the observation zone within the observation range. The photosensor has an effective detection region dimensioned to determine the limits of the observation range. An output circuit is connected to the photosensor to output an object detection signal only when the photosensor detects the spot. To avoid spurious actuation of the apparatus caused by drift or slowly changing conditions in the background light, the optical source includes a photoemitter for intermittently emitting a pulsing optical ray in response to a sampling signal, and the output circuit operates to produce successively sampled data according to the intensity of the detected optical ray and to calculate a relative change between preceding and succeeding sampled data.

15 Claims, 6 Drawing Sheets

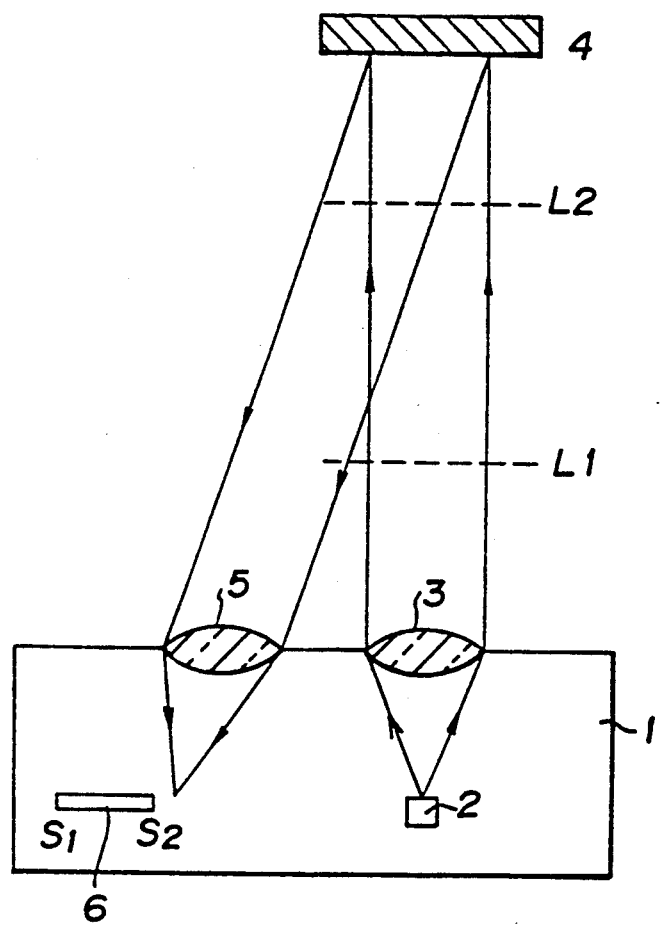
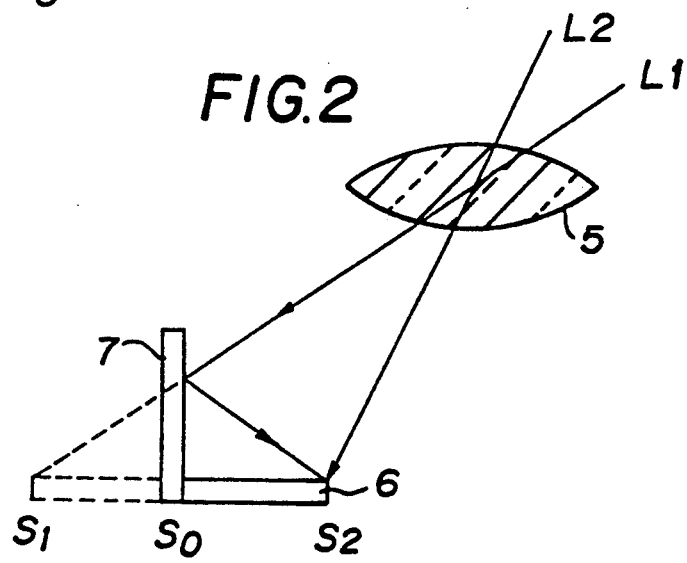

OBJECT DETECTION APPARATUS OF THE PHOTOELECTRIC REFLECTION TYPE WITH SAMPLED DATA

BACKGROUND OF THE INVENTION

The present invention relates to an object detection apparatus of the photoelectric reflection type having a photoemitter and a photosensor for photoelectrically detecting an optical ray reflected from an object to determine whether an object is present or absent, and more specifically relates to a particular apparatus of the type for detecting an object which is entering an observation zone within a predetermined observation range along the optical axis. The present invention also relates to an object detection apparatus of the type for detecting when an object enters an observation zone by comparing intensity of the light reflected from the object with intensity of the light reflected from the background.

The known conventional object detection apparatus is constructed such that a photoemitter and photosensor are disposed adjacently on a common plane so as to detect an optical ray reflected from an object which crosses an optical axis perpendicular to the common plane.

However, the conventional object detection apparatus of the photoelectric reflection type has a drawback that a detection range is substantially infinite along the optical axis such that an irrelevant article would be detected incidentally as long as such article is not concealed by a background. There is a practical need for detecting only an object which is expected to enter into a given observation range, but the conventional object detection apparatus of the reflection type for general purpose cannot satisfy such need and would require an additional tool for limiting a travel distance of incident optical ray.

Conventionally, the known object detection apparatus is constructed such as to direct an incident light to a given observation zone and to compare the intensity of the light reflected from an object surface with a predetermined reference value to thereby detect the object.

However, such conventional detection apparatus uses an absolute reference value for judging as to whether an object is present or absent, thereby causing misjudgment that occurs due to various fluctuating factors. Such factors include a drift of the incident light intensity, variation of the reflectivity of the object surface, sensitivity change of the photosensor and influence of the background.

Particularly in the known object detection apparatus of the general purpose type, there is a drawback that the light reflected from the object cannot be discriminated from the light reflected from the background in terms of the intensity when using the absolute reference value due to variation of the background reflectivity and object distance.

SUMMARY OF THE INVENTION

In view of the above noted drawbacks of the prior art, a first object of the present invention is to provide an object detection apparatus of the photoelectric reflection type effectively to ensure the selective detection of a target object. Further, a second object of the present invention is to provide an object detection apparatus of the photoelectric reflection type effectively to avoid misdetection of an article while eliminating noise from surroundings.

For this, according to the first aspect of the present invention, the object detection apparatus of the photoelectric reflection type is comprised of an optical source for generating an optical ray, an optical incident system having an optical axis extending through an observation zone in a direction of its definite observation range for directing the optical ray along the optical axis, and an optical collecting system for collecting the optical ray reflected by the object which traverses the optical axis to focus on a receiving area an optical spot, location of which depends on an axial distance of the object. Further, a definite photosensor is disposed to cover a part of the receiving area and operates only when an object enters into the observation zone within the observation range for detecting an optical spot within the covered part of the receiving area, and an output circuit is connected to output an object detection signal only when the photosensor detects the spot.

Preferably, the definite photosensor has a sensing face extending between one edge registered with a spot which corresponds to the farthest end of the observation range and another edge registered with another spot which corresponds to the closest end of the observation range.

Further preferably, the optical source includes a photoemitter for intermittently emitting a pulsed optical ray in response to a sampling signal, and the output circuit operates to produce successively sampled data according to the intensity of the detected optical ray and to calculate a relative change between preceding and succeeding sampled data so as to output the object detection signal.

According to the above described first aspect of the present invention, when an object enters to traverse the optical axis within the observation range, the optical ray reflected by the object can be collected and focused onto an effective face of the photosensor to thereby recognize the entering of the object. When an object enters to traverse the optical axis out of the observation range, the optical ray reflected by the object is collected but focused outside the effective face of the photosensor and therefore is not detected so that an object existing out of the observation range cannot be recognized.

According to the second aspect of the invention, the object detection apparatus is comprised of an optical source for intermittently generating an optical ray in response to a periodically inputted sampling signal, optical means for directing the intermittent optical ray through an observation zone to a background surface, and receiving means for receiving the intermittent optical ray reflected by either surface of an object entering the observation zone and the background surface to successively produce sampled data according to the intensity of the reflected intermittent optical ray. The apparatus further includes sampled data processing means or output means for the calculating ratio of preceding and succeeding sampled data to produce an output signal indicative of the entrance of the object when the calculated ratio falls out of a set threshold value range $1 \pm \alpha$.

According to the above described second aspect of the present invention, the receiving means normally receives the incident intermittent optical ray reflected by the background having a given reflectivity. Then, when an object enters the observation zone at a particular timing, immediately thereafter the intermittent incident optical ray is reflected from the entering object by the rate of its reflectivity and then received by the receiving means. The relative intensity ratio is deviated from the threshold value $1 \pm \alpha$ by an amount $\beta$ between the pair of pulses of the intermittent optical ray immediately before and after the entering timing due to reflectivity difference between the object and background surface to thereby recognize the entering of the object.

BRIEF DESCRIPTION OF THE DRAWINGS

FIG. 1C shows the same apparatus where an object is placed beyond the farthest end of observation range; FIG. 2 is an enlarged partial view of modification of the first embodiment of the inventive object detection apparatus of the photoelectric type.

DETAILED DESCRIPTION OF THE INVENTION

Figure 1A:
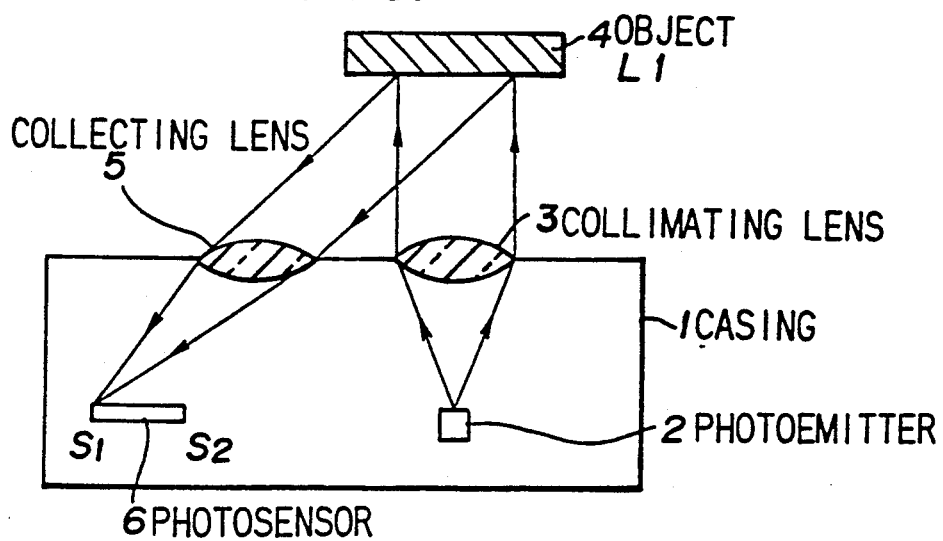
FIG. 1A is a schematic diagram showing the overall structure of a first embodiment of the inventive object detection apparatus of the photoelectric type where an object is placed in the closest end of observation range.

Hereinafter, preferred embodiments of the present invention are described in detail with reference to the attached drawings. FIG. 1A is a schematic view showing an overall construction of a first embodiment of the inventive object detection apparatus of the photoelectric type, where an object is disposed at the closest end of a definite observation range. A casing 1 contains an optical source, an optical incident system, an optical collecting system, a photosensor and an output circuit, and the casing 1 can be set at a desired location in a desired direction.

The optical source includes a photoemitter 2 composed of, for example, a light-emitting-diode for emitting an optical ray such as a visible light and an infrared radiation. The optical incident system includes a collimating lens 3 disposed in front of the photoemitter 2 and having an optical axis in parallel to a direction of a predetermined observation range. The lens 3 collimates the optical ray from the photoemitter 2 to direct a beam of the optical ray in the optical axis direction. In the FIG. 1 state, the optical axis is blocked by a sample article or object 4 disposed at the closest end L1 of a given observation range, and the beam of the incident optical ray is reflected by the object 4.

The optical collecting system is comprised of a collecting lens 5 disposed adjacent to the collimating lens 3 on a common plane. The collecting lens 5 collects a part of the optical ray reflected by the object 4 to form an optical spot at a particular location S1 on a receiving area or a focal plane.

A discrete photosensor 6 is disposed along the receiving area to cover a part thereof. An effective outer edge of the sensing face of the photosensor 6 is arranged in conjunction with the particular location or position S1 so that the photosensor 6 can detect the optical ray reflected by the object 4 disposed at the closest end L1 of the observation range. However, the photosensor 6 cannot receive an optical ray reflected by an object disposed between the collimating lens 3 and the closest end L1, since the focused spot of such reflected optical ray is positioned away outwardly from the outer critical position S1.

Figure 1B:
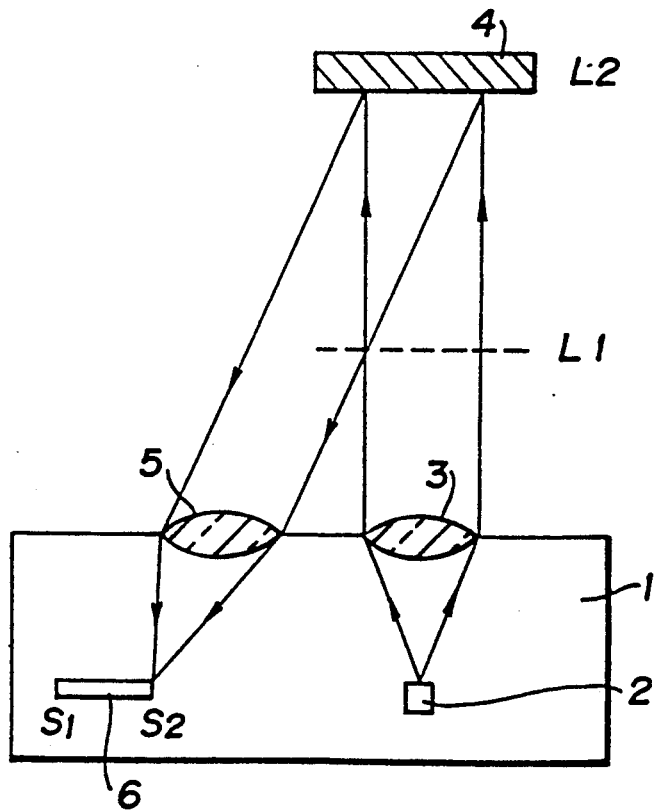
FIG. 1B shows the same apparatus where an object is placed in the farthest end of observation range.

FIG. 1B indicates a state in which an object 4 is placed in the farthest end L2 of the observation range in the object detection apparatus of FIG. 1A. As shown in the figure, the collecting lens 5 collects a part of the optical ray reflected by the object 4 to form a focused spot at another particular location or position S2. This position S2 is located inside the outer critical position S1 due to the optical arrangement. An effective inner edge of the sensing face of the photosensor 6 is arranged in conjunction with the inner critical position S2. Therefore, the photosensor 6 can detect the optical ray reflected by the object disposed at the farthest end of the observation range. As apparent from FIGS. 1A and 1B, the photosensor 6 can effectively receive between the outermost and innermost positions S1 and S2 the optical ray reflected from the object 4 which is present in the observation range defined between the closest end L1 and the farthest end L2.

In contrast, FIG. 1C indicates a state where an object 4 is placed beyond the farthest end L2 of the observation range in the same object detection apparatus. The collecting lens 5 collects a part of the optical ray reflected by the object 4 to focus on the receiving area. However, the focused spot is shifted far inwardly from the position S2 outside the effective sensing face of the photosensor 6.

FIG. 2 is a sectional view showing modification of the first embodiment in the combination of an optical collecting system and a photosensor used in the inventive object detection apparatus of the photoelectric type. The optical collecting system includes a collecting lens 5 for collecting an optical ray reflected by an object to form a spot on a given area. A photosensor 6 has an inner edge in registration with a spot position S2 corresponding to the farthest end L2 of the observation range, but an outer edge S0 thereof is formed inside another spot position S1 corresponding to the closest end L1. A mirror 7 is vertically disposed at the outer edge in registration with the spot position S0, so that the optical ray reflected by an object within the farthest end L2 of the observation range is collected directly or after the reflection on the mirror 7 onto an effective sensing face of the photosensor 6 between the inner and outer edges as shown in the figure. Accordingly, this modification can reduce area dimension of the precious photosensor by half as compared to the first embodiment shown in FIGS. 1A–1C, while the modification has only the farthest limit of the observation range and no closest limit. Practically, only the farthest end is of importance in various applications. The modification can be used effectively in such case.

Figure 3:
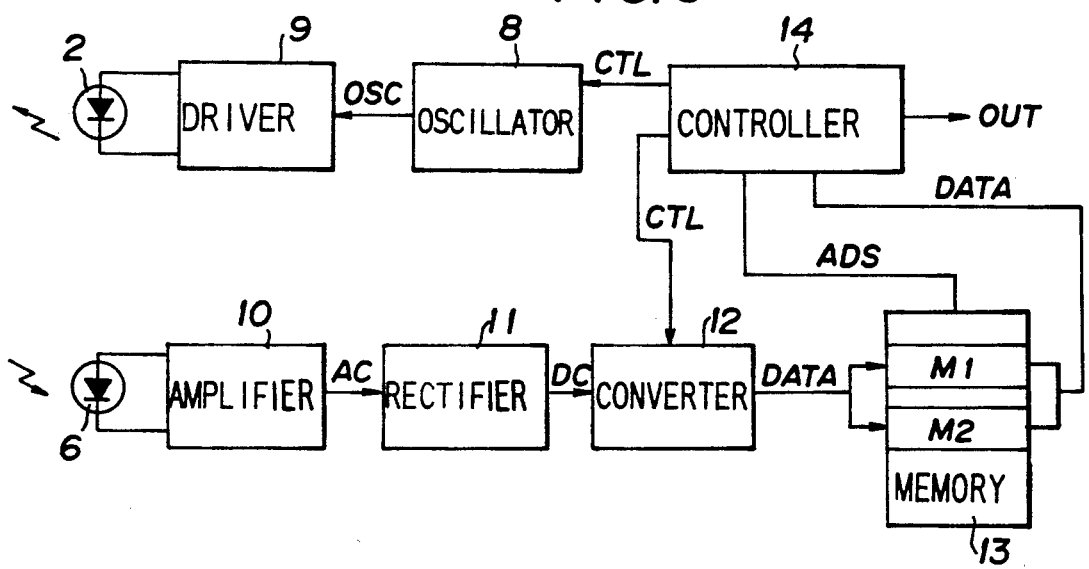
FIG. 3 is a block diagram showing overall circuit structure of the first embodiment of the inventive object detection apparatus of the photoelectric type.

FIG. 3 is a block diagram showing an overall circuit structure of the first embodiment of the inventive object detecting apparatus of the photoelectric type. At the outset, the optical source includes an oscillator 8 undergoing intermittent oscillation in response to a clock signal CTL inputted intermittently at a given interval so as to output a pulsed sampling signal OSC containing an oscillating frequency component superposed on each pulse of the sampling signal. Further, a driver 9 is provided to feed to the photoemitter 2 an intermittent driving current modulated by the oscillating frequency in response to the sampling signal OSC. The photoemitter 2 is intermittently driven by the driving current to emit an optical ray modulated by the oscillating frequency in synchronization with the clock signal CTL.

The output circuit includes the photosensor 6 effective to receive the optical ray collected by the optical collecting system to output a photocurrent having an amplitude corresponding to the intensity of the received optical ray. An amplifier 10 is connected to the photosensor 6 to filter and amplify the photocurrent to thereby output intermittently an AC-detection signal AC. The amplifier 10 is comprised, for example, of a narrow band filter for filtering the oscillating frequency component contained in the photocurrent and an AC amplifier. A rectifier 11 composed, for example, of an integrating circuit is connected to the amplifier 10 to rectify and level the AC-detection signal AC to output intermittently a pulsed DC-detection signal DC having a corresponding pulse height. An A/D converter 12 is connected to the rectifier 11 to convert the pulse component of the DC-detection signal DC sequentially into corresponding sampled data DATA in synchronization with the clock signal CTL. Accordingly, each sampled data DATA indicates time-sequential change of the intensity of the collected optical ray in synchronization with the clock signal CTL.

Further, the output circuit includes a memory 13 and a controller 14. The memory 13 has at least two registers or memory addresses M1 and M2 so as to alternatively store the sampled data fed from the converter 12 such that the old data is updated by new data every other input timing of the sampled data. The controller 14 is composed, for example, of CPU and operates to output the clock signal CTL and to access the memory 13 according to an address signal ADS to retrieve update data written in the addresses M1 and M2 so as to calculate the ratio thereof. The controller 14 outputs based on the calculation result in an output signal OUT indicative of whether an object is present or absent in the given observation range.

Figure 4:
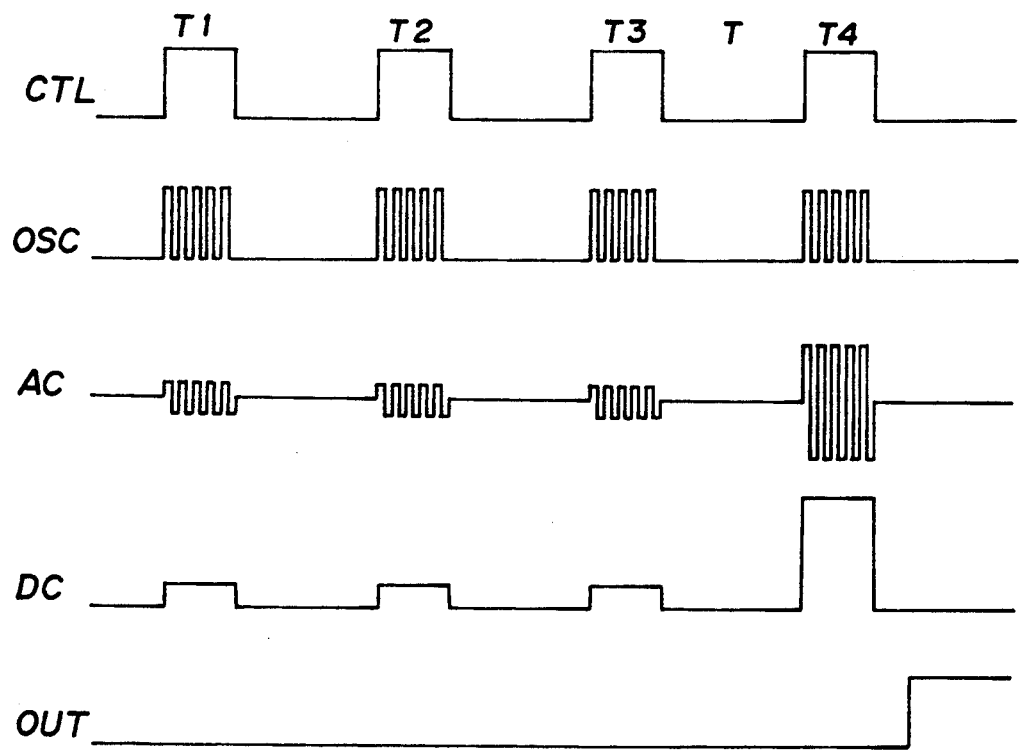
FIG. 4 is a timing chart that illustrates the operation of the FIG. 3 circuit.

Next, the description is given for the operation of the first embodiment of the inventive object detection apparatus of the photoelectric reflection type with reference to FIG. 4. First, the controller 14 generates periodically the clock signal CTL. The clock signal CTL contains time sequentially arranged clock pulses effective to define sequentially sampling timings T1, T2, T3, T4, - - - . The oscillator 8 oscillates during a duration of each clock pulse in synchronization with the sampling timings to thereby produce the sampling signal OSC containing a superposed high oscillating frequency component. Next, the driver 9 feeds the pulsed driving current, frequency-modulated in response to the frequency-superposed sampling signal OSC, to the photoemitter 2 at the sampling timings of T1, T2, - - - . The photoemitter 2 emits the frequency-modulated pulsed light successively at the timing of T1, T2, T3, . . . .

The photosensor 6 receives the light collected by the optical collecting system to continuously output the detection current having the amplitude change in response to the intensity change of the collected light. The amplifier 10 filters and amplifies the detection signal to output the AC-detection current AC. By this filtering or frequency-detection, all noise components can be removed from the primary detection current so that the AC-detection current AC contains substantially a signal component related to the emitted incident light. Stated otherwise, the incident light side and the collected light side can be coupled to each other without external noise.

As shown in FIG. 4, an object 4 enters into the observation range at a particular timing T between the third and fourth timings T3 and T4. Before the entering timing T, the AC-detection current signal AC has a relatively small amplitude at the preceding timings T1, T2 and T3 because the photosensor 6 does not receive the collected light reflected by the object, except leakage of the incident light or external light from surrounding reflective surfaces. On the other hand, immediately after the entering time T, the AC-detection signal AC exhibits a relatively greater amplitude at the subsequent time T4 because the photosensor 6 can effectively receive the collected light after reflection by the object 4.

Then, the rectifier 11 rectifies and levels the AC-detection signal AC to convert the same into the pulsed DC-detection signal DC having a pulse height corresponding to the amplitude of the AC-detection signal. The converter 12 operates in synchronization with the clock signal CTL to digitize the analog DC-detection signal DC to sequentially output the sampled data DATA corresponding to each pulse height of the DC-detection signal at the timings of T1, T2, T3, etc.

Finally, the series of sampled data DATA are alternatively stored in the pair of addresses M1 and M2 of the memory 13 to update the contents in the addresses M1 and M2. For example, the data obtained at time T1 are stored in the address M1 and the second data obtained at time T2 are stored in the other address M2. Then, the data obtained at time T3 are written into the address M1 after erasing the previous data, and the data obtained at the timing T4 are written into the other address M2 after erasing the previously stored data. The controller 14 accesses the pair of addresses M1 and M2 at the given times to retrieve the update data so as to calculate their relative ratio. Before the entering time T of the object, the sampled data is not changed so that the relative ratio is a value of 1. However, when comparing the succeeding sampled data obtained at time T4 immediately after the entering time T with the preceding sampled data obtained at time T3 immediately before the entering time T, these preceding and succeeding data are very different from each other so that the relative ratio thereof is greatly deviated from the value 1. Consequently, as shown in the figure, the output signal OUT is switched from the low level to the high level to indicate the entering of the object.

In the above described embodiment, a pair of time-sequential data are compared to each other to detect whether or not the object enters. However, in place of or in addition to the above described relative comparison, it would be suitable to compare each of the sampled data periodically to an absolutely set reference value so detect as to whether or not an object enters. Especially in the present embodiment, the absolute comparison is also effective since the sampled data changes greatly for only transient time when an object enters the observation range.

As described above, according to the first embodiment of the present invention, the object can be detected only when entering a preset observation range so that the target object is accurately recognized without detection error which would be caused by reflection from any irrelevant article outside the observation range. Further, the pulsed incident light is used in synchronization with a sampling timing, thereby achieving the effect that the entering of an article can be monitored substantially in real time basis.

Figure 5A:
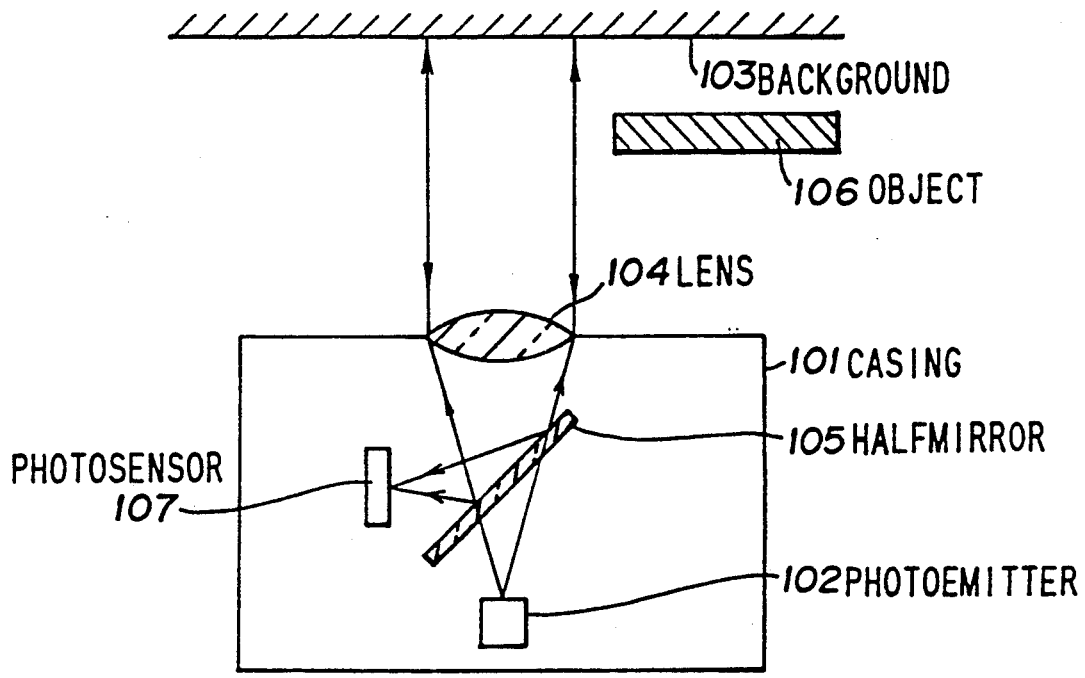
FIG. 5A is a schematic diagram showing overall structure of a second embodiment of the inventive object detection apparatus of the photoelectric type in which an object is placed outside an observation zone.

FIG. 5A is a schematic diagram showing the overall structure of a second embodiment of the inventive object detection apparatus of the photoelectric reflection type under normal state where an object is positioned out of an observation zone. As shown in the figure, the object detection apparatus is comprised of a casing 101 which contains an optical source, an optical system, an optical receiver and an output circuit.

The optical source includes a photoemitter 102 composed, for example, of a light emitting diode. The optical system includes a collimating lens 104 for collimating a light emitted from the photoemitter 102 in the form of a parallel beam to direct the same onto a background surface 103 disposed behind an observation zone, and a beam splitter composed, for example, of a half mirror 105 and disposed between the lens 104 and the photoemitter 102 for dividing a returning light traveling through the observation zone from the incident light. In the normal state, the object 106 or target article is placed out of the observation zone. The optical receiver includes a photosensor 107 composed, for example, of a phototransistor for detecting the reflected light divided by the half mirror 105.

Figure 5B:
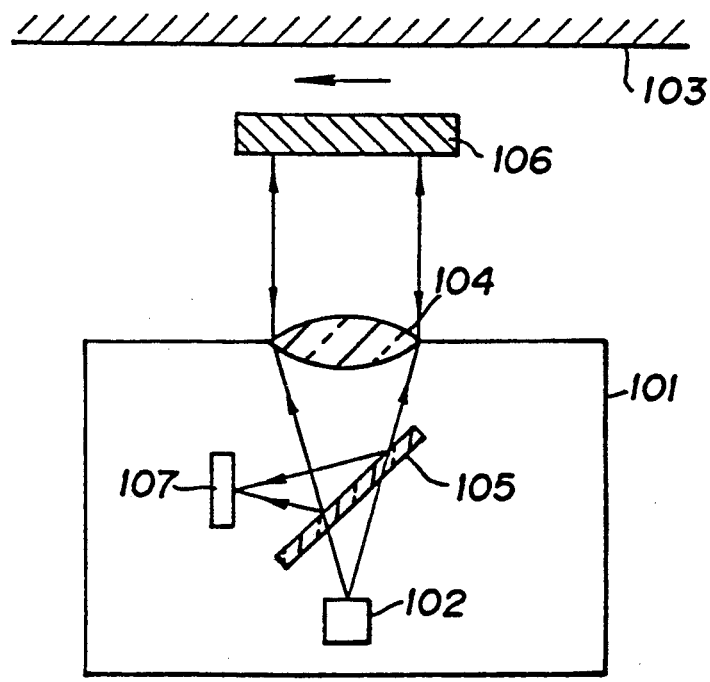
FIG. 5B shows the same apparatus in which an object is placed within an observation zone.

FIG. 5B shows another state in the same object detection apparatus, where the object 106 has entered the observation zone as indicated by the arrow. Incident light from the photoemitter 102 is blocked by the entering object 106 and is reflected thereby. The reflected light returns through the same path as shown in FIG. 5A to converge onto the photosensor 107.

Figure 6:
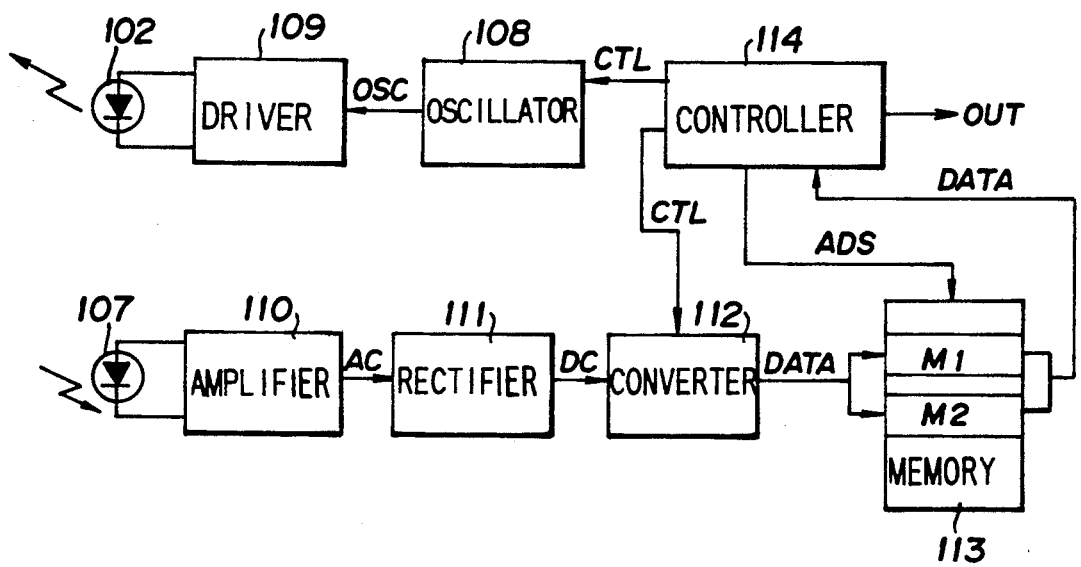
FIG. 6 is a block diagram showing overall circuit construction of the second embodiment of the inventive object detection apparatus of the photoelectric type.

FIG. 6 is a block diagram showing an overall circuit structure of the second embodiment of the inventive object detecting apparatus of the photoelectric type. At the outset, the optical source includes an oscillator 108 undergoing intermittent oscillation in response to a clock signal CTL inputted intermittently at a given interval so as to output a pulsed sampling signal OSC containing an oscillating frequency component superposed on each pulse of the sampling signal. Further, a driver 109 is provided to feed to the photoemitter 102 an intermittent driving current modulated by the oscillating frequency in response to the sampling signal. The photoemitter 102 is intermittently driven by the driving current to emit an optical ray modulated by the oscillating frequency in synchronization with the clock signal CTL.

The optical receiver includes the photosensor 107 to receive the optical ray reflected by the background surface and object surface to output a photocurrent having an amplitude corresponding to the intensity of the received optical ray. An amplifier 110 is connected to the photosensor 107 to detect and amplify the photocurrent to thereby output intermittently an AC-detection signal AC. The amplifier 110 is comprised, for example, of a narrow band filter for filtering a given frequency component and an AC-amplifier. A rectifier 111 composed, for example, of an integrating circuit is connected to the amplifier 110 to rectify and level the AC-detection signal AC to output intermittently a pulsed DC-detection signal DC having a corresponding pulse height. An A/D converter 112 is connected to the rectifier 111 to convert the pulse component of the DC-detection signal DC sequentially into a corresponding sampled data DATA in synchronization with the clock signal CTL. Accordingly, each sampled data DATA indicates time-sequentially the intensity of the reflected optical ray received by the photosensor.

Finally, the output circuit includes a memory 113 and a controller 114. The memory 113 has at least two memory addresses or registers M1 and M2 so as to alternatively store the sampled data fed from the converter 112 such that the old data is updated by new data every other input timing of the sampled data. The controller 114 is composed, for example, of CPU and operates to output the clock signal CTL and to successively access the memory 113 according to an address signal ADS to retrieve update data written in the registers M1 and M2 so as to calculate the relative ratio thereof. The controller 114 outputs based on the calculation result in an output signal OUT indicative of whether an object enters an observation zone.

Figure 7:
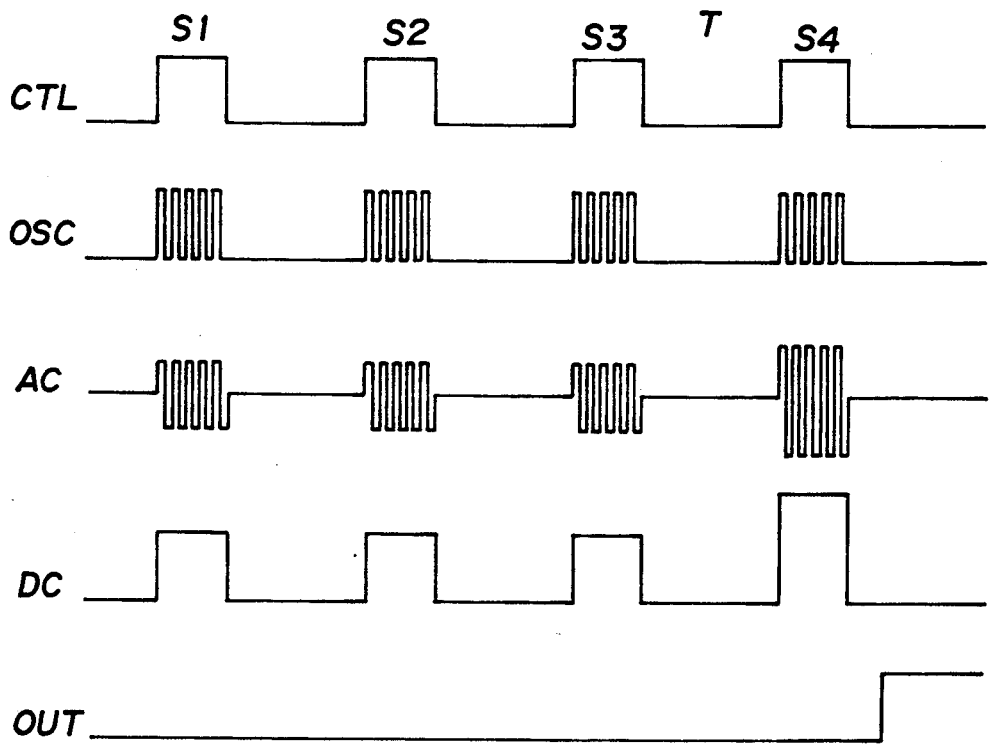
FIG. 7 is a timing chart to illustrate operation of the FIG. 6 circuit.

Next, the description is given for the operation of the second embodiment of the inventive object detection apparatus of the photoelectric type with reference to FIG. 7. First, the controller 114 periodically generates the clock signal CTL. The clock signal CTL contains time-sequentially arranged clock pulses which define sequentially sampling timings S1, S2, S3, S4, . . . . The oscillator 108 oscillates during a duration of each clock pulse in synchronization with the sampling timings to thereby produce the sampling signal OSC containing a superposed high oscillating frequency component. Next, the driver 109 feeds the pulsed driving current, frequency-modulated in response to the frequency-superposed sampling signal OSC, to the photoemitter 102 at the sampling times. The photoemitter 102 emits the frequency-modulated pulsive light successively at the timings of S1, S2, S3, . . . .

The photosensor 107 receives the reflected and modulated light at these times to intermittently output the detection current having an amplitude proportional to the intensity of the reflected light. The amplifier 110 filters and amplifies the frequency-modulated detection signal to output the corresponding AC-detection current AC. By this filtering or frequency-detection, all noise components can be removed from the modulated detection current to thereby improve the detection accuracy of object.

As shown in FIG. 7, an object 106 enters into the observation zone at a particular time T between the third and fourth timings S3 and S4. Before the entering time T, the AC-detection current signal AC has a relatively small amplitude at the preceding timings S1, S2 and S3 due to weak reflectivity of the background. On the other hand, immediately after the entering time, the AC-detection signal AC exhibits a relatively larger amplitude at the succeeding time S4 due to strong reflectivity of the object surface.

Then, the rectifier 111 rectifies and levels the AC-detection signal AC to convert the same into the pulsed DC-detection signal DC having a pulse height corresponding to the amplitude of the AC-detection signal.

The converter 112 operates in synchronization with the clock signal CTL to digitize the analog DC-detection signal DC to sequentially output the sampled data DATA corresponding to each pulse height of the DC-detection signal at the times of S1, S2, S3, . . . .

Finally, the series of sampled data DATA are alternatively stored in the pair of registers M1 and M2 of the memory 113 to thereby update the contents in the registers M1 and M2. For example, the first data obtained at time S1 are stored in the register M1 and the second data obtained at time S2 are stored in the other register M2. Then, the third data obtained at time S3 are written into the register M1 after erasing the previous first data, and the fourth data obtained at time S4 is written into the other register M2 after erasing the previously stored second data. The controller 114 addresses the pair of registers M1 and M2 at the given time to retrieve the update data so as to calculate the relative ratio thereof. Before the entering time T of the object, the sampled data is not changed so that the relative ratio is equal to a value of 1. However, when comparing the succeeding sampled data obtained at time S4 immediately after the entering time T with the preceding sampled data obtained at time S3 immediately before the entering time T, these preceding and succeeding data are greatly different from each other due to intensity change of the reflected light so that the relative ratio thereof falls outside a predetermined threshold value range $1 \pm \alpha$. The value $\alpha$ indicates detection allowance. Consequently, as shown in the figure, the output signal OUT is switched from the low level to the high level to indicate the entering of the object.

As described above, according to the second embodiment of the present invention, intensity change of the received light due to entering of the object is periodically monitored. Therefore, when the apparatus inadvertently fails to detect entering or displacement of the object due to various error factors, the apparatus would not detect the presence of the object any longer after the object has been held stationary in the observation zone because the intensity change would never occur. In order to eliminate such possible misdetection, the present embodiment includes means for retrieving updated sample data periodically at an interval longer than the sampling interval determined by the controller 114 to compare the retrieved data with a predetermined absolute reference value to thereby produce the output signal indicative of entering and standing of the object in the observation zone when the difference between them exceeds a predetermined value.

Figure 8:
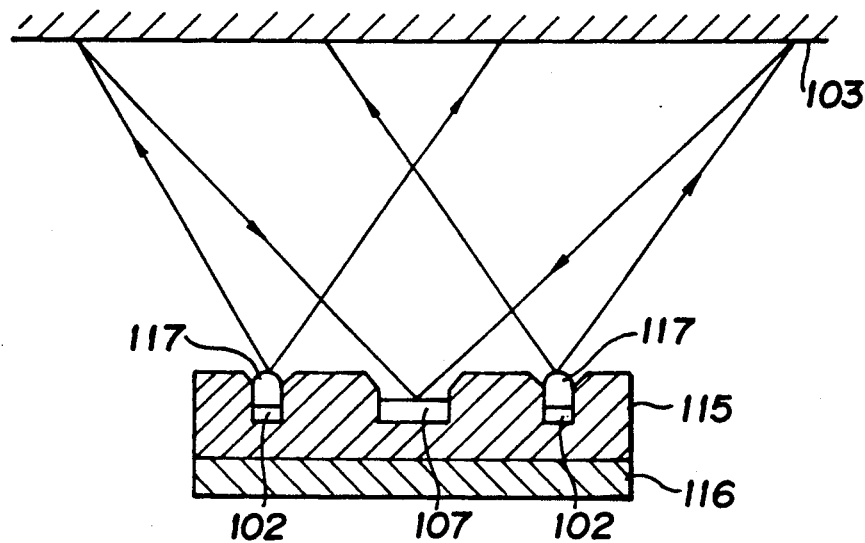
FIG. 8 is a sectional view showing modification of the second embodiment of the inventive object detection apparatus of the photoelectric type.

FIG. 8 is a sectional view showing modification of the second embodiment of the inventive object detection apparatus of the photoelectric reflection type. A pair of photoemitters 102 are embedded in a plastic substrate 115 in spaced relation to each other at a given distance. Further, a photosensor 107 is embedded between the pair of photoemitters 102. A circuit board 116 is fixed to a rear side of the substrate 115 for carrying a circuit portion of the detection apparatus.

A strongly reflective optical member 117 is disposed on an emitting surface of each photoemitter 102 for diverging the generated light, as shown in the figure, so that the diverging light is irradiated onto the background 103 through a wide incident angle range to cover the entire observation zone. A part of the reflected light is detected by the photosensor 107 disposed in a center portion to monitor intensity change of the reflected light due to the entrance of an object into the observation zone. This modification is advantageous in covering the entire observation zone, but has less detection accuracy as compared to the embodiment in FIGS. 5A and 5B. On the other hand, the embodiment in FIGS. 5A and 5B uses an incident light in the form of parallel beam effective in covering only a central section of the observation zone, while it has a high sensitivity for the object detection.

Figure 9:
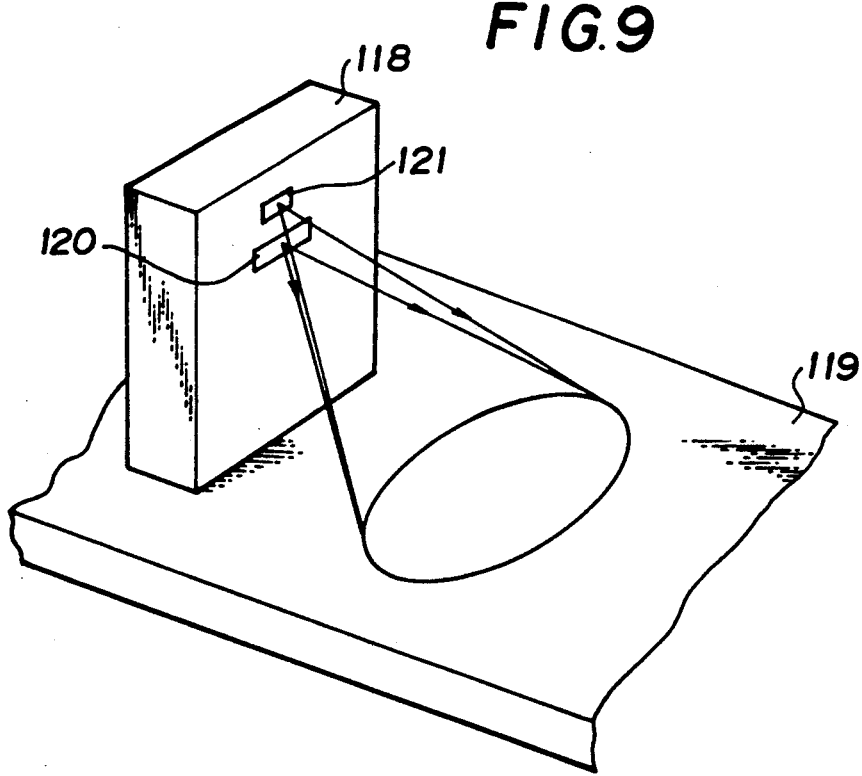
FIG. 9 is a perspective view of a portable read terminal instrument of POS system, applied with an object detector of the photoelectric type shown in FIG. 8.

FIG. 9 is a perspective view of a read terminal device of the POS system incorporated with an object detector of the photoelectric reflection type shown in FIG. 8. The portable read terminal device 118 can be set on a desired check counter table 119 as opposed to the install type. The read terminal device 118 is provided with an optical code reader 120 for reading a code attached to an article placed in an observation or check zone. The code reader 120 generally utilizes a semiconductor laser as its light source. In order to expand the life span of the semiconductor laser, the laser is turned on only when an article enters into the check zone. In order to control the switching of the semiconductor laser, the read terminal device is provided with an object detector 121 of the photoelectric reflection type shown in FIG. 8. The object detector 120 irradiates the entire observation zone on the check counter table so as to detect accurately the entering of object or article without regard to absolute reflectivity of the background, i.e., the surface of the selected check counter table.

As described above, according to the second embodiment of the present invention, the object detector operates to detect the intensity of the reflected light from the observation zone periodically by a given sampling time interval to compare a pair of preceding and succeeding intensity data of the reflected light with each other so as to recognize whether or not an object enters or not. By such construction, highly accurate detection of object can be effectively carried out without regard to various fluctuating factors such as variation of emitted light intensity and variation of sensitivity of the photosensor.

Further, the entering and displacement of the object can be detected without regard to absolute reflectivities of the object surface and the background surface, thereby effectively recognizing various kinds of articles. The object detector can be set in various spots for general purpose use. Moreover, a wide range of the observation zone can be covered by using a diverging incident light.

What is claimed is:

1. An object detection apparatus of the photoelectric type, comprising: an optical source for generating an optical ray; optical incident means having an optical axis extending through a sole observation zone in a direction along a limited observation range for irradiating the optical ray along the optical axis; optical collecting means for collecting the optical ray reflected back from the sole observation zone so as to focus on a given receiving area an optical spot; a single stationary photodetector disposed to cover a part of the receiving area and having an effective detection region dimensioned to determine the limits of the observation range and for receiving and detecting said optical spot to produce an electrical signal indicative of an intensity of the reflected optical ray which originates from either an object or a background, and output means for processing said electrical signal and for outputting a detection signal indicative of the moving of an object into the observation zone within the observation range, said output means including processing means for producing successively sampled data representative of an intensity of the reflected optical ray.

2. An object detection apparatus according to claim 1; wherein the optical source includes a photoemitter responsive to a sampling signal to intermittently emit an optical ray, and said processing means is operative when a variation between preceding and succeeding sampled data exceeds a predetermined threshold value for outputting the detection signal.

3. An object detection apparatus according to claim 1; wherein the optical source includes a photoemitter for emitting an optical ray having a modulated intensity according to a given frequency, and the output means includes means for frequency-detecting a modulated electric signal fed from the photodetector and corresponding to the modulated intensity of the collected optical ray.

4. An object detection apparatus according to claim 1; wherein the photodetector has an effective detection region extending between one spot location corresponding to a farthest end of the observation range and another spot location corresponding to a closest end of the observation range.

5. An object detection apparatus according to claim 1; wherein the photodetector has an effective detection region having an edge registered with a spot location corresponding to a farthest end of the observation range, and the optical collecting means includes a mirror for directing an optical ray reflected from an object within the farthest end of the observation range to the effective detection region within the edge thereof.

6. An object detection apparatus of the photoelectric type, comprising: an optical source for intermittently generating an optical ray in response to a periodic sampling signal; optical means for projecting the intermittent optical ray onto a background surface through an observation zone; receiving means for receiving the intermittent optical ray reflected by either of the background surface and a surface of an object to successively generate sampled data representative of an intensity of the received intermittent optical ray; and output means for time-sequentially calculating a relative variation between preceding and succeeding sampled data to detect variation of the intensity of the received intermittent optical ray to produce an output signal indicative of the entering of the object into the observation zone when the calculated relative variation exceeds a predetermined threshold value.

7. An object detection apparatus according to claim 6; wherein the optical source includes a point photoemitter, the receiving means includes a photosensor, and the optical means comprises a collimating lens for converting a diverging optical ray emitted from the point photoemitter into a beam of the optical ray to direct the same onto the background surface and a half mirror disposed between the collimating lens and the point photoemitter for directing a returning optical ray to the photosensor.

8. An object detection apparatus according to claim 6; wherein the optical source includes a pair of photoemitters spaced from each other, and the optical means includes diverging means for diverging an optical ray from the pair of photoemitters to direct the diverged optical ray to the background surface.

9. An object detection apparatus according to claim 6; wherein the optical source includes an oscillator for undergoing an intermittent oscillation in response to the sampling signal, a driver for producing a driving current modulated according to an oscillating frequency of the oscillator and a photoemitter for emitting an optical ray modulated according to the modulated driving current, and wherein the receiving means includes a photosensor for receiving a modulated and reflected optical ray and outputting an AC-current in response to the received optical ray, an amplifier for filtering and amplifying the AC-current, a rectifier for rectifying the leveling and amplified AC-current to output a corresponding DC-current, and an A/D converter responsive to the sampling signal for sequentially converting the DC-current into a series of sampled data.

10. An object detection apparatus according to claim 6; wherein the output means includes a memory having a pair of registers for alternatively storing the sequentially outputted sampled data and for updating the stored data, and control means for retrieving a pair of the updated data to calculate a relative ratio thereof.

11. An object detection apparatus according to claim 6; wherein the output means includes means operative periodically at an interval longer than that of the sampling timing for comparing an updated one of the sampled data with a predetermined absolute reference value to produce an output signal indicative of entering of an object when a relative variation therebetween exceeds a predetermined threshold value.

12. An object detection apparatus according to claim 2; wherein the processing means includes means for determining said relative variation in terms of a relative ratio of preceding and succeeding sampled data.

13. An object detection apparatus according to claim 6; wherein the output means includes means for calculating said relative variation in terms of a relative ratio of preceding and succeeding sampled data.

14. An object detection apparatus of the photoelectric type, comprising: an optical source for generating an optical ray; optical incident means having an optical axis extending through a sole observation zone in a direction along a limited observation range for projecting the optical ray through said range; optical collecting means for collecting the optical ray reflected back from the observation zone and focusing said ray into an optical spot; a single stationary photodetector disposed to cover a part of the receiving area and having an effective detection region dimensioned to determine the limits of the observation range for receiving said optical spot and producing an electrical signal indicative of an intensity of the reflected optical ray and output means for receiving said electrical signal for outputting a detection signal indicative of the moving of an object within said observation range, wherein said output means includes processing means for producing successively sampled data corresponding to the intensity of the reflected optical ray and for outputting said detection signal when a variation between successively sampled data representative of a variation in the intensity of the reflected optical ray exceeds a predetermined threshold.

15. A method for detecting an object by means of a photoelectric apparatus including an optical source, an optical incident means having an optical axis extending through a sole observation zone, an optical collecting means, and a single stationary photodetector, comprising the steps of:

generating an optical ray with said optical source;
projecting said ray along said sole observation zone with said optical incident means to generate a reflected ray when an object enters said zone;

collecting and focusing said reflected ray into an optical spot onto said photodetector with said optical collecting means;
successively sampling data representative of an intensity of the reflected optical ray, and
adjusting the dimensions of said single photodetector such that said photodetector can receive only a reflected ray originating from a limited observation range within said sole observation zone to enhance the reliability of the apparatus.

* * * * *